United States Patent [19]

Yamazaki et al.

[11] 4,237,013
[45] Dec. 2, 1980

[54] HOLLOW FIBER PERMEABILITY APPARATUS

[75] Inventors: Masahiro Yamazaki, Kamakura; Yoshihiro Makuta, Kawasaki; Yasushi Joh; Noriaki Kaneko, both of Yokohama, all of Japan

[73] Assignee: Nippon Zeon Co., Ltd., Tokyo, Japan

[21] Appl. No.: 21,885

[22] Filed: Mar. 19, 1979

Related U.S. Application Data

[63] Continuation of Ser. No. 791,236, Apr. 27, 1977, abandoned.

[30] Foreign Application Priority Data

Aug. 12, 1976 [JP] Japan ................................. 51-96271

[51] Int. Cl.³ ............................................ B01D 31/00
[52] U.S. Cl. ................................. 210/321.2; 210/456
[58] Field of Search ................... 210/22, 456, 55, 158, 210/321 R, 321 B, 321 A; 422/48

[56] References Cited

U.S. PATENT DOCUMENTS

| 4,001,110 | 1/1977 | Geen et al. | 210/321 B |
|---|---|---|---|
| 4,031,012 | 6/1977 | Gics | 55/158 |
| 4,082,670 | 4/1978 | Joh | 210/321 B |
| 4,108,764 | 8/1978 | Kaneko et al. | 210/321 A |
| 4,124,510 | 11/1978 | Joh | 210/321 B |
| 4,125,468 | 11/1976 | Joh et al. | 210/321 A |

Primary Examiner—Charles N. Hart
Assistant Examiner—E. Rollins Cross
Attorney, Agent, or Firm—McDougall, Hersh & Scott

[57] ABSTRACT

A hollow-fiber permeability apparatus includes a housing having a permeating region, a bundle of permeable-wall hollow fibers in the permeating region, means for supplying a first fluid flowing between the exteriors of the fibers, another means for passing a second fluid through the interiors of fibers such that materials selectively permeate through the walls of the fibers, and an enlarged cross-section portion to define at least one compartment between the bundle and a wall of the housing and having an inlet opening for introducing the first fluid into the housing, the permeating region having a flattened cross-section in the direction substantially perpendicular to the lengthwise direction of the fibers, and the enlarged cross-section portion being formed at least along substantially the whole lengths of the longer side of the cross section of the permeating region.

11 Claims, 18 Drawing Figures

PRIOR ART
FIG. 1
FIG. 2
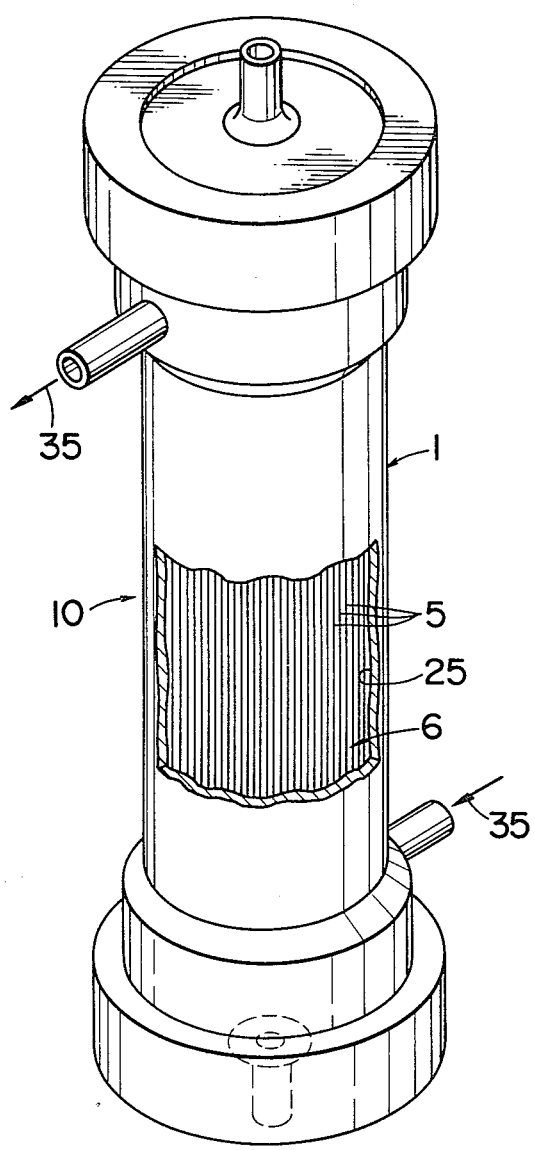
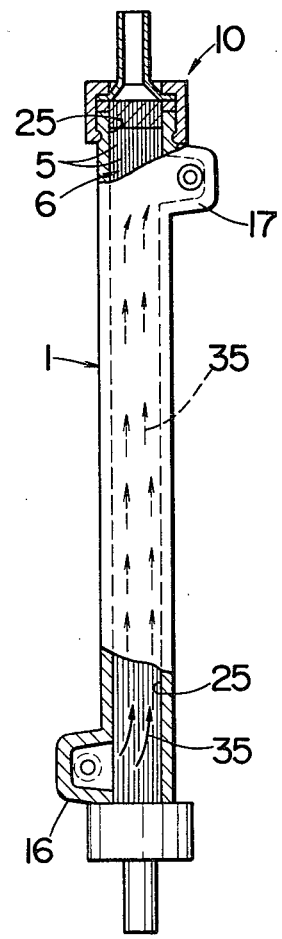

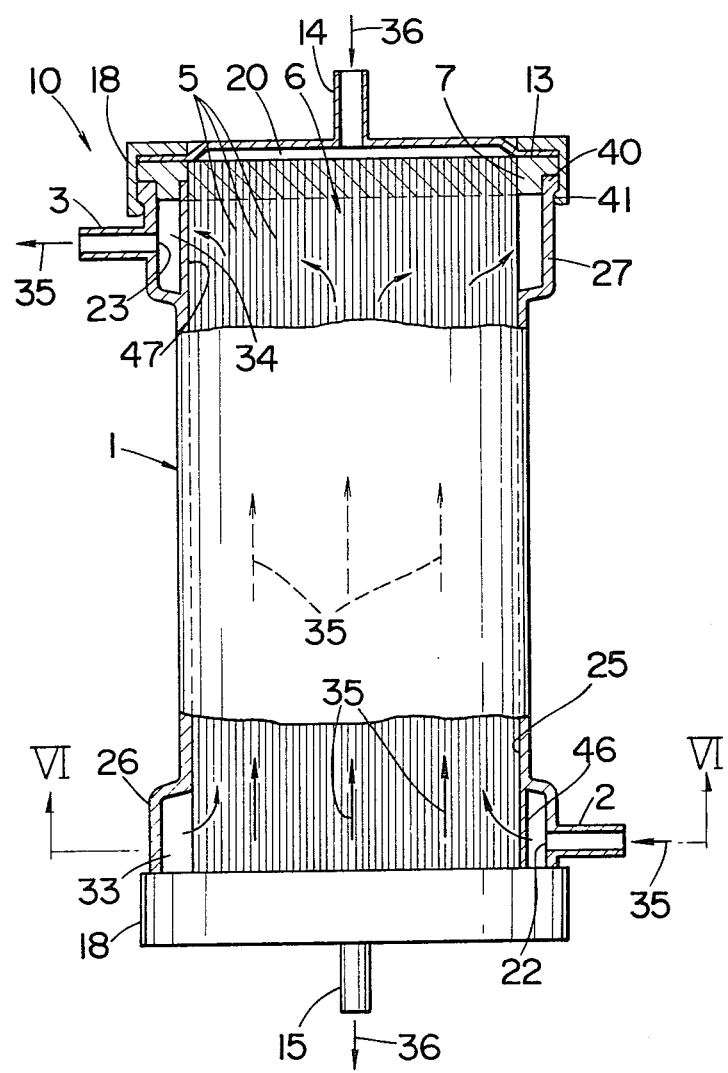

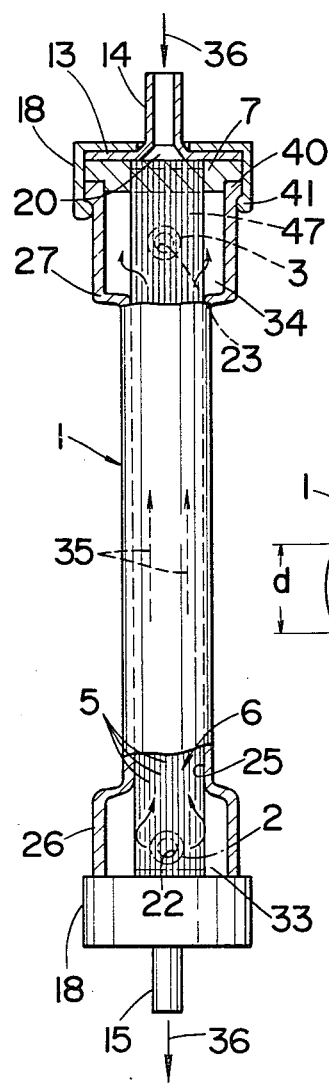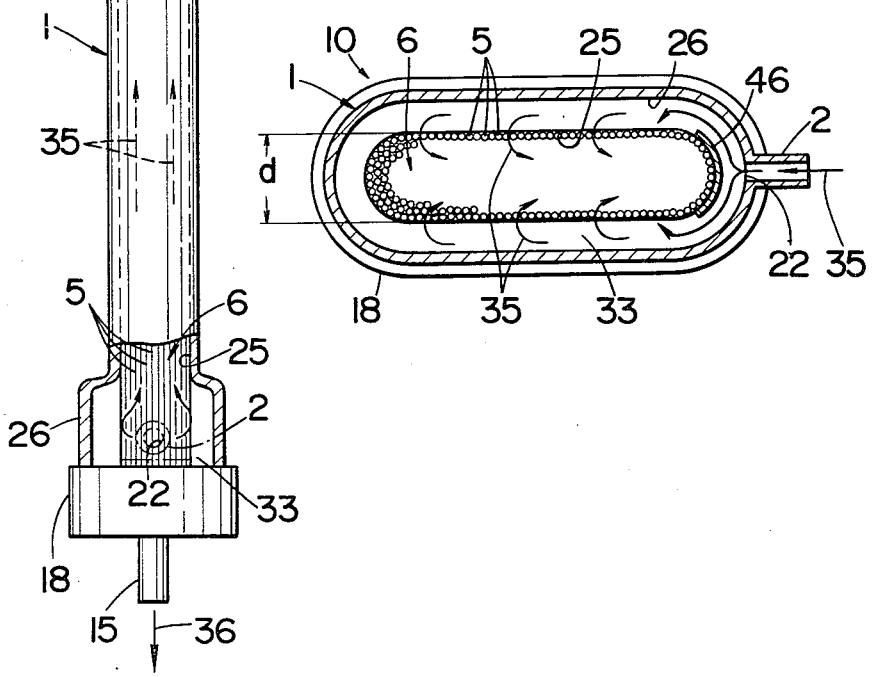

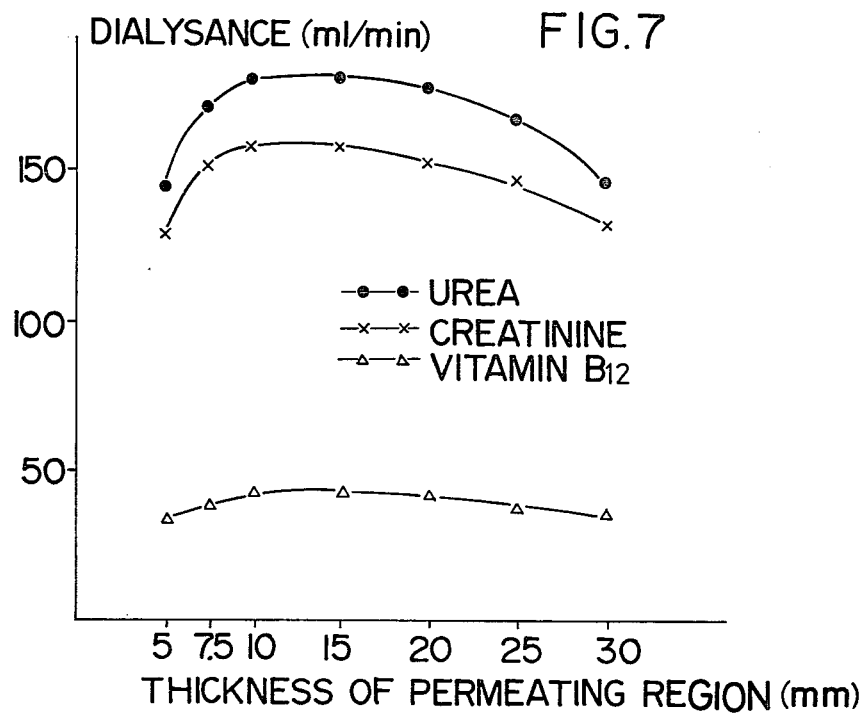
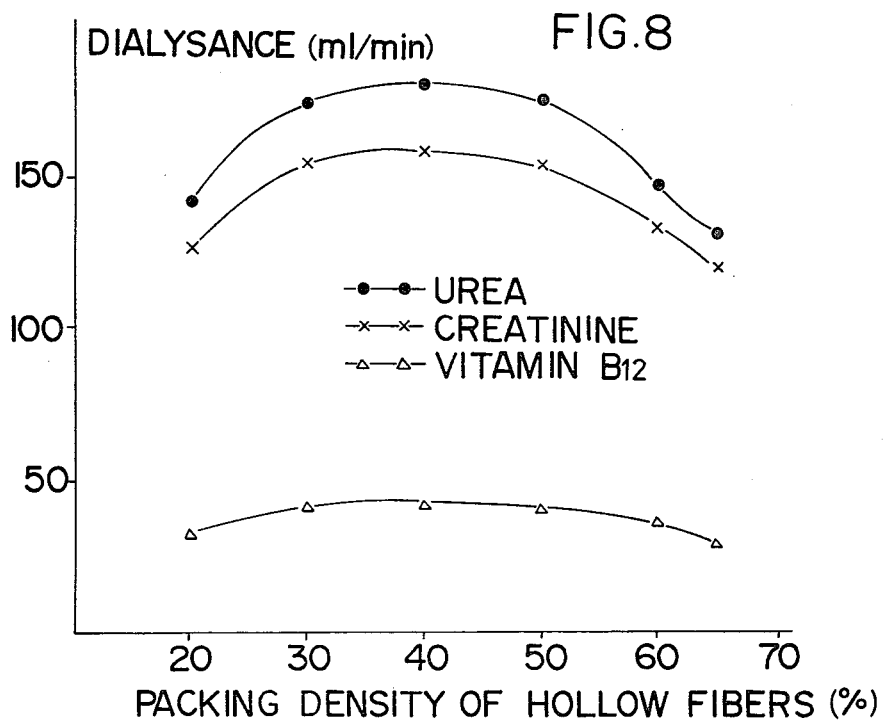

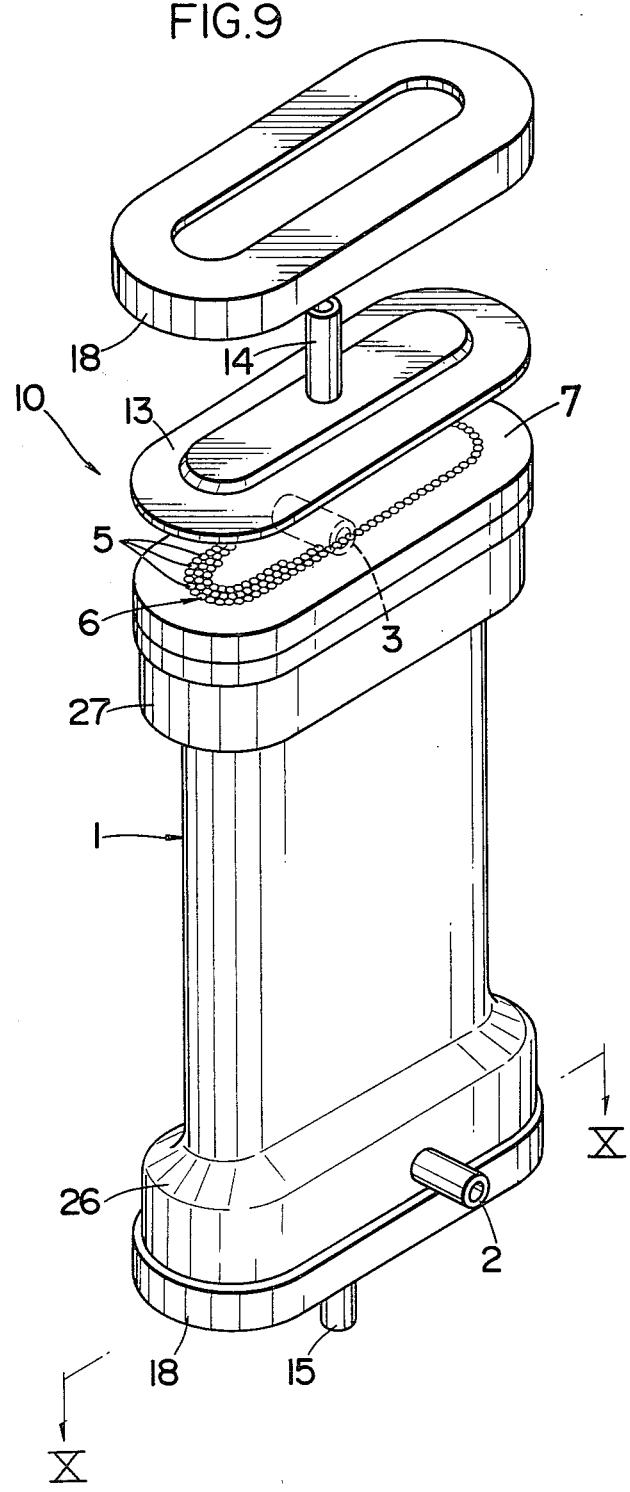

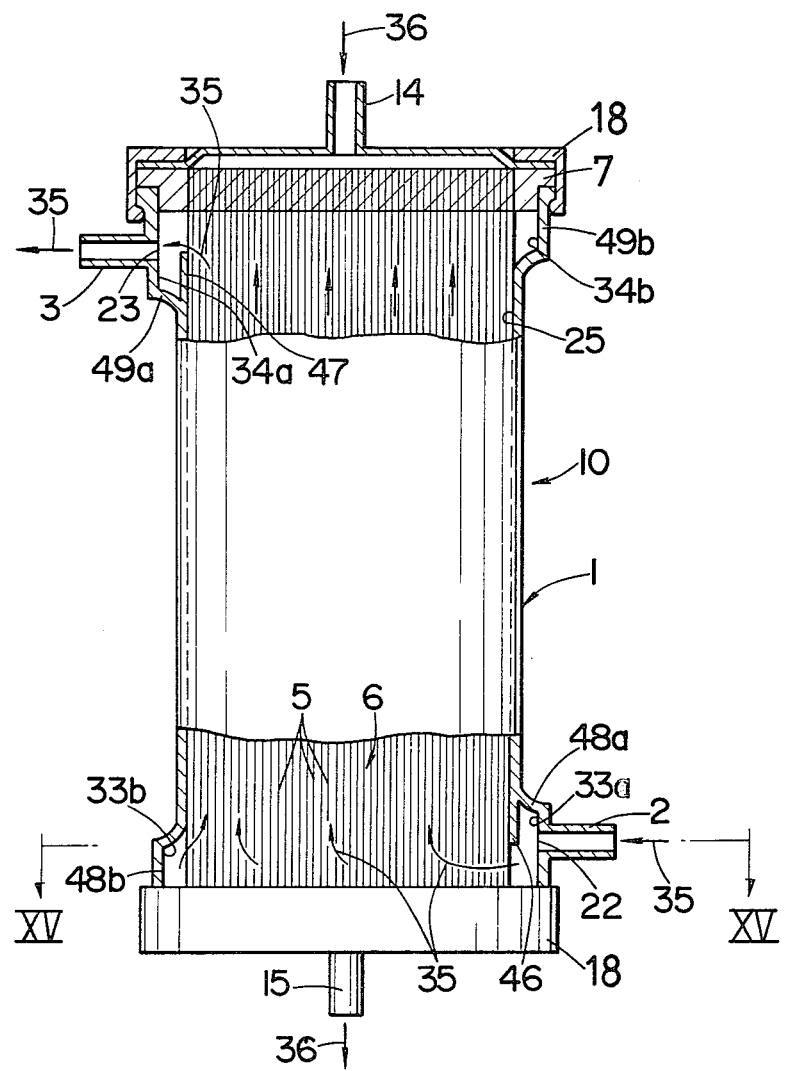
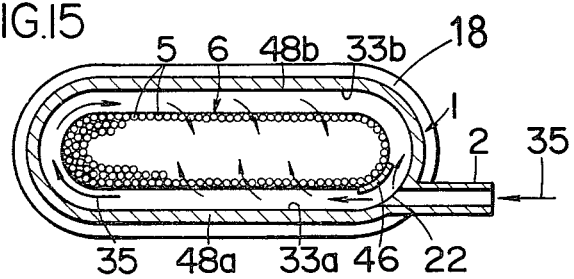

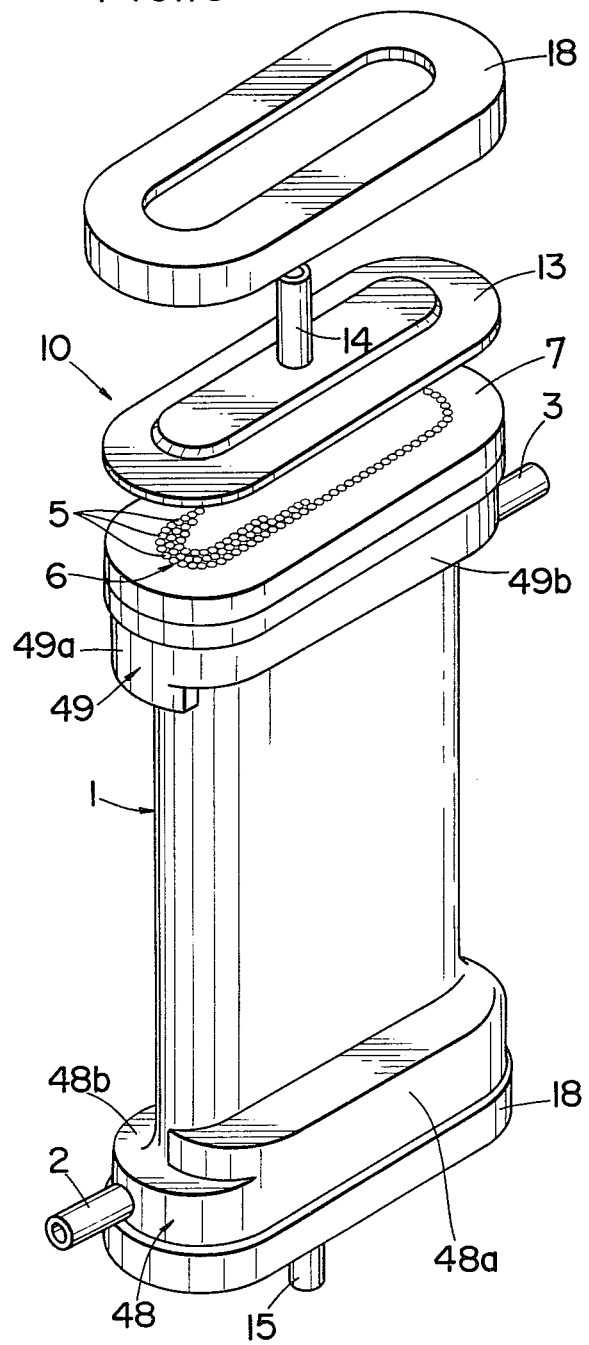

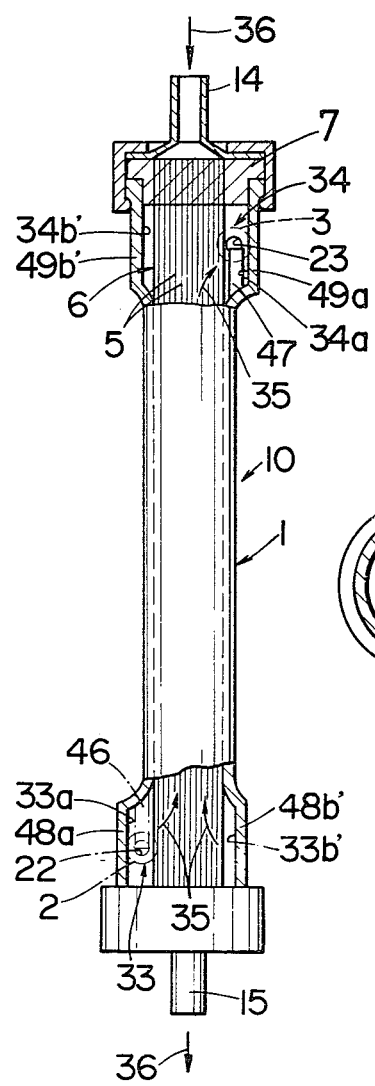
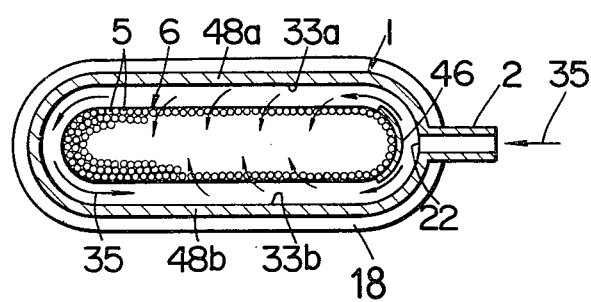

HOLLOW FIBER PERMEABILITY APPARATUS

This is a continuation of application Ser. No. 791,236, filed Apr. 27, 1977, now abandoned.

BACKGROUND OF THE INVENTION

1. Field of the Invention

This invention relates generally to a hollow-fiber permeability apparatus, and more particularly to a hollow-fiber permeability apparatus in which a permeating region of a housing contains a bundle of hollow fibers, and materials can selectively permeate through the membances formed by the permeable walls of the hollow fibers, between a fluid flowing along the exteriors of the hollow fibers, and another fluid flowing the interiors of the hollow fibers. The permeation may be based on the principles of osmosis, dialysis, ultrafiltration, reverse osmosis or the like.

2. Description of the Prior Art

For example, a conventional hollow-fiber permeability apparatus (dialyzer) is used for blood dialysis, in which toxic materials are removed from the blood of a patient suffering from renal failure or medicinal poisoning.

The hollow fibers used in the blood dialyzer provide a relatively large effective surface area of membrane for the size. Therefore, the dialyzer can be smaller than conventional coil-type or Kiil-type dialyzer. Thus, the blood priming volume of hollow fiber dialyzer can be smaller, which is beneficial to the patient during dialysis. The apparatus is also easier to handle, and the hollow fibres are strong for pressure change, therefore the hollow fibers are advantageous for ultrafiltration.

Since the hollow fiber dialyzer has many advantages it has become popular recently. However, the dialyzer has the following disadvantages.

As shown in FIG. 1 ten to fifteen thousand hollow fibers 5 are closely bundled in the permeating region 25 of the cylindrical housing 1 of the dialyzer 10. It is difficult that the dialysate 35 can perfuse uniformly through the whole part of the bundle 6. It is experimentally proved that the dialysate flows mainly around the peripheral region of the bundle 6 adjacent to the inner wall of the housing 1, and the dialysis performance is extremely low in the central region of the bundle 6.

In order to remove the above described disadvantages, for example, the hollow fiber dialyzer 10 shown in FIG. 2 was already proposed in U.S. Pat. Appln. Ser. No. 653,351. In the apparatus 10 of FIG. 2, the crosswise cross-section of the housing 1 is flat and generally oblong with round short sides. The housing 1 has, as a whole, point symmetrical contiguration. Enlarged cross-section portions 16 and 17 which are trapezoid in cross-section, are formed in the opposite longer sides of the housing 1 to which the inlet and outlet tubes are connected, respectively.

As the results of the progress of the study, the inventors have found that, in the blood dialyzer 10 having the oblong cross section, the thickness of the hollow fiber bundle 6, packing wet-density of hollow fibers, and the shapes of the enlarged cross-section portion connected to the dialysate inlet and outlet having great influences on the dialysate flow 35 in the housing 1 and hence on the performance of the dialyzer.

SUMMARY OF THE INVENTION

An object of this invention is to provide a hollow fiber permeability apparatus (dialyzer) in which a localized fluid flow in the permeable region is prevented, whereby the material permeability can be significantly improved.

Another object of this invention is to provide a hollow fiber dialyzer in which the above described fluid (dialysate) is more uniformly distributed in the whole part of the hollow fiber bundle, whereby the material permeability can be much improved.

A further object of this invention is to provide a hollow fiber dialyzer in which the thickness of the fiber bundle (distance between the longer sides of the oblong crosswise cross section of the permeating region), the packing density of hollow fibers and the shapes of the fluid inlet and outlet portions are specified, whereby the material permeation efficiency can be significantly improved.

In accordance with one aspect of this invention, a hollow-fiber dialyzer includes a housing having a permeating region, a bundle of permeable-wall hollow fibers in the permeating region, means for supplying a first fluid into the permeable region which flows exteriors of fibers, another means for passing a second fluid through the interior of the fibers such that materials selectively permeate through the walls of the fibers, and an enlarged cross-section portion to define at least one compartment between the bundle and a wall of the housing and having an inlet opening for introducing the first fluid into the housing, the permeating region having a flattened cross-section in the direction substantially perpendicular to the length direction of the fibers, and the enlarged cross-section portion being formed at least along substantially the whole lengths of the longer sides of the cross-section of the permeating region.

The above and other objects, features and advantages of this invention, will be apparent in the following detailed description of illustrative embodiments which are to be read in connection with the accompanying drawings.

BRIEF DESCRIPTION OF THE DRAWINGS

FIG. 1 is a partly broken away perspective view of a conventional blood dialysis apparatus (dialyzer);

FIG. 2 is a partly broken away side view of a blood dialysis apparatus proposed in U.S. Pat. Appln. Ser. No. 653,351;

FIG. 4 is a partly broken away front view of the apparatus of FIG. 3;

FIG. 5 is a partly broken away side view of the apparatus of FIG. 4;

FIG. 6 is a cross-sectional view taken along the line VI—VI of FIG. 4;

FIG. 7 is a graph showing the relationship between the dialysance and the thickness d of the permeating region in the apparatus of FIG. 3 to FIG. 6;

FIG. 8 is a graph showing the relationship between the dialysance and the packing density of the hollow fibers in the apparatus of FIG. 3 to FIG. 6;

FIG. 9 is a partly exploded perspective view of a blood dialyzer according to a second embodiment of this invention;

FIG. 14 is a partly broken away front view of the apparatus of FIG. 13;

FIG. 15 is a cross-sectional view taken along the line XV—XV of FIG. 14;

FIG. 16 is a partly exploded perspective view of a blood dialyzer according to a fifth embodiment of this invention;

FIG. 17 is a cross-sectional view of the apparatus of FIG. 16; and

FIG. 18 is a partly broken away side view of a blood dialyzer according to a sixth embodiment of this invention.

DESCRIPTION OF THE PREFERRED EMBODIMENTS

Figure 3:
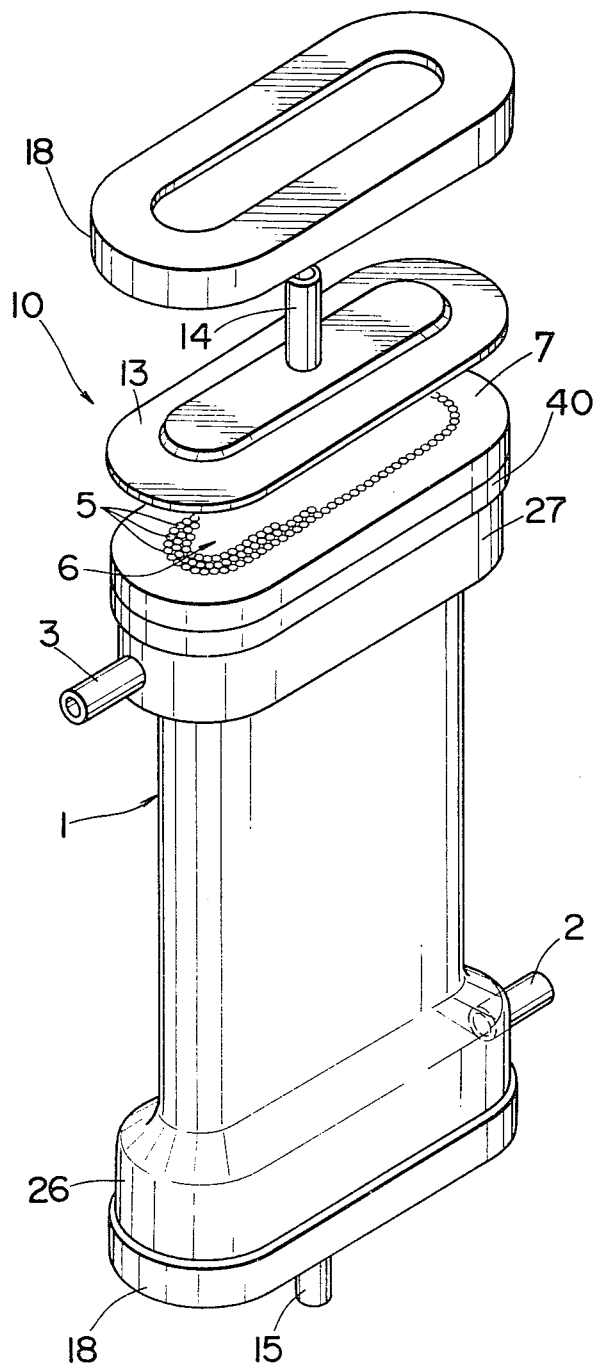
FIG. 3 is a partly exploded perspective view of a blood dialysis apparatus according to a first embodiment of this invention.

Next, embodiments of this invention which will be applied to blood dialyzer, will be described with reference to FIG. 3 to FIG. 18. Parts in the embodiments which correspond to the parts in FIG. 1 and FIG. 2, are denoted by the same reference numerals, which will not be described.

FIG. 3 to FIG. 8 show the first embodiment of this invention. Referring to FIG. 3 to FIG. 6, the housing 1 of the blood dialyzer 10 has an oblong cross-section whose short sides are semicircular. The cross wise cross-section of the housing 1 may be elliptic or rectangular with round corners. Enlarged cross-section portions 26 and 27 which are substantially trapezoidal, are formed at upper and lower ends of the housing 1 as shown in FIG. 4 and FIG. 5. Enlarged cross-section regions 33 and 34 having substantially trapezoidal shapes defined between the inner wall of the housing 1 and the circumferential surface of the hollow fiber bundle 6 by the enlarged portions 26 and 27.

As apparently shown in FIG. 6, the enlarged regions 33 and 34 surround the hollow fiber bundle 6 at the upper and lower ends of the housing 1. The inlet tube 2 is connected to the right shorter side of the enlarged cross-section portion 26, while the outlet tube 3 is connected to the left shorter side of the enlarged cross-section portion 27. Preferably, the inlet and outlet tubes 2 and 3 are placed on the opposite sides of the enlarged cross-section portions relative to each other. By this configuration, the dialysate 35 can be more effectively distributed into the whole part of the hollow fiber bundle 6. However, from the viewpoint of the facilitation for handling and manufacturing, the inlet and outlet tubes 2 and 3 may be formed on the same shorter sides of the enlarged portions 26 and 27.

Since the resistance for the dialysate flow is much lower in the enlarged cross-section regions 33 and 34 than in the permeating region 25, dialysate is rapidly distributed into the enlarged cross-section regions 33 and 34.

Guide plates 46 and 47 may be arranged opposite to openings 22 and 23 of the inlet and outlet tubes 2 and 3 in the enlarged portions 33 and 34. The guide plate 46 prevents the hollow fibers 5 from the damage by the incoming dialysate 35. Moreover, the guide plate 46 functions to distribute the dialysate 35 into the enlarged cross-section region 33 uniformly. The other guide plate 47 functions to collect the dialysate 35 to the opening 23 of the outlet tube 3 in the enlarged cross-section portion 34 effectively. The upper and lower end portions of the housing 1 are potted with potting material 7. Upper and lower covers 13, and fastening rings 18 for fixing the covers 13 in the housing 1 are oblong in cross section, similar to the upper and lower end portions of the housing 1. The upper and lower covers 13 define oblong blood compartments 20.

Circumferential projections 40 are formed integrally with upper and lower ends of the housing 1. And circumferential projections 41 for engaging with the projections 40 are formed integrally with the ends of the fastening rings 18, which are pressed to the upper and lower end portions of the housing 1. The projections 41 click with the projections 40 of the housing, as shown in FIG. 4 and FIG. 5. The potting materials 7 and the covers 13 are fastened between the fastening rings 18 and the housing 1.

Beside the method mentioned above, any available method for connecting the cover and housing case can be employed. When the upper and lower end portions of the housing 1 are circiular in cross-section as in FIG. 1, the fastening rings may be screwed to the upper and lower end portions of the housing 1. In this case, the intermediate portion of the housing 1 can be oblong in cross section, and the hollow fibers can easily conform to the cross section of the flat housing 1.

When the dialysate 35 is introduced into the housing 1 from the inlet opening 22, substantially all of the dialysate 35 is first led into the open space of the enlarged cross-section region 33. Accordingly, the dialysate 35 is effectively distributed along all part of the lower end portion of the hollow fiber bundle 6 in the enlarged portion 33, then it flows upwardly along exteriors of the fibers uniformly in the whole bundle as shown by the arrows in FIG. 4 and FIG. 5. As a result, good dialysis performance can be obtained.

The dialysate 34 flowed along the hollow fiber bundle 6 is collected into the enlarged portion 34 through the substantially whole circumference of the hollow fiber bundle 6, and is discharged through the outlet tube 3.

In this embodiment, the lengthwise cross sections of the enlarged regions 33 and 34 are substantially trapezoid. However, the cross-section may be arbitrarily shaped, as occasion demands. The cross-section may be shaped by combination of straight lines or curves, or of straight lines and curves.

Next, the dialysis performance obtained by the above described apparatus will be described with reference to experimental results.

The experimental conditions are as follows:

Hollow Fibers

Kind: Cellulose
Outer diameter: 247 $\mu$m (dry)
Inner diameter: 215 $\mu$m (dry)
Effective length: 200 mm
Number of fibers: 5200
Total membrane area of bundle of hollow fibers: 0.7 m$^2$

Housing

Cross-section taken along the direction perpendicular to the length of the hollow fibers: 60 mm × 15 mm Volumes of enlarged cross-section regions 33 and 34: 6 cm³
Packing density of hollow fibers (volme of hollow fibers swelled with dialysate relative to volume of permeating region to be charged with hollow fibres); 41 volume percent
The dialysance D (as defined by Wolff), is represented by the following formula:

$$D = Qb \cdot \frac{Cbi - Cbo}{Cbi - Cdi} \quad (I)$$

where D represents a dialysance for blood, Qb a flow rate of blood, Cbi a concentration of the blood at the inlet opening, Cdi a concentration of the dialysate at the inlet opening, and Cbo a concentration of the blood at the outlet opening.

A solution containing area, creatinine and vitamine $B_{12}$, as pseudo-blood was flowed through the interiors of the hollow fibers 5 at the rate of Qb=200 ml/min, while pure water as dialysate was flowed counter currently through the exterior of the hollow fibers at the rate of Qd=500 ml/min. The results are shown in Table I.

TABLE I

|  | Dialysance (ml/min) | | |
| --- | --- | --- | --- |
|  | Urea | Creatinine | Vitamin $B_{12}$ |
| Apparatus of FIG. 2 | 135 | 118 | 31 |
| Apparatus of this embodiment | 158 | 137 | 33 |

In the appearance of FIG. 2, enlarged cross-sections 16 and 17 are formed on the opposite sides at the lower and upper end portions with the fiber bundle in-between. These are formed along the opposite longer sides of the cross wise cross section of the housing 1. In other arrangements, the apparatus of FIG. 2 is the same as that of this embodiment.

From the above results, it is understandable that the dialysate 34 perfuses more effectively into the fiber bundle and the whole membrane area of the hollow fibers 5 can be effectively perfused. The reason for this good result can be explained that the dialysate 35 first distributed in the open space of the enlarged regions 33 and 34, which surround the hollow fiber bundle, can easily penetrate into the flat-fiber bundle very smoothly.

The flat shape of the cross wise cross-section of the housing 1 has great influence on the dialysate flow and hence on the dialysis performance. The dialysis performance depends on the ratio of the longer side to the shorter side of the cross wise cross-section of the housing 1. The experimental results on the influence of the shape of the cross section are shown in Table II. In this experiment, the thickness d of the permeating region 25 was varied. The thickness d is the inner length of the shorter side of the cross section of the intermediate portion (permeable region) of the housing 1. The number of the hollow fibers used was 7500. The total membrane area of the hollow fibers 5 was 1 m². The conventional apparatus (FIG. 1) was used for comparison. The hollow fibers were packed in the apparatus of FIG. 1, in the same condition as in the apparatus of this embodiment. Other experimental conditions were the same as those given in Table I. The results are shown in Table II.

TABLE II

|  | Thickness of permeating region d(mm) | Dialysance (ml/min) | | |
| --- | --- | --- | --- | --- |
|  |  | Urea | Creatinine | Vitamin $B_{12}$ |
| Apparatus of this embodiment | 5 | 143 | 129 | 34 |
|  | 7.5 | 170 | 152 | 38 |
|  | 10 | 179 | 158 | 43 |
|  | 15 | 178 | 157 | 42 |
|  | 20 | 175 | 151 | 41 |
|  | 25 | 165 | 145 | 37 |
|  | 30 | 144 | 130 | 35 |
| Apparatus of FIG. 1 | 40 (diameter) | 143 | 129 | 35 |

The results are also shown in FIG. 7. As understood from the results, better results are obtained within the range of thickness d from 5 mm to 30 mm especially, within the range of 10 mm to 20 mm.

When the thickness d of the permeating region 25 is within the above range, the dialysate 34 first introduced in the enlarged regions 33 can penetrate into the center of the fiber bundle and flows along through the exteriors of the hollow fibers 5 uniformly in the whole part of the bundle. On the other hand, when the thickness of d is beyond the range described above, the superiority of the apparatus of this embodiment to the conventional apparatus of FIG. 1 is reduced.

When the thickness d is much smaller than the above range, blood hardly distribute uniformly into the the interiors of the hollow fibers 5, because of too flat cross-section of the bundle and hence this draw-back becomes prodominant in an extreme flat type. It is difficult to obtain good performance under such a condition.

The packing density of hollow fibers 5 has also great influence on the dialysis performance. The experiments were made to evaluate the influence of the packing density. In these experiments, the packing density was varied with constant thickness d (10 mm). The number of cellulose hollow fibers were about 7500, which correspond to total membrane area of 1 m². Other experimental conditions were the same as in the above described experiments. The experimental results are shown in Table III.

TABLE III

|  | Packing density of hollow fibers (%) | Dialysance (ml/min) | | |
| --- | --- | --- | --- | --- |
|  |  | Urea | Creatinine | Vitamin $B_{12}$ |
| Apparatus of this embodiment | 20 | 147 | 135 | 40 |
|  | 30 | 175 | 155 | 42 |
|  | 40 | 179 | 158 | 43 |
|  | 50 | 173 | 154 | 41 |
|  | 60 | 145 | 131 | 37 |
|  | 65 | 131 | 120 | 30 |
| Apparatus of FIG. 1 | 41 | 143 | 129 | 35 |

The experimental results are further shown in FIG. 8.

As understood from the experimental results, good performances are obtained within the range of the packing density of 25 to 60%, especially, within the range of 30 to 50%.

With the above range of the packing density, the dialysate 35 is capable of penetrating uniformly in the whole part of the hollow fiber bundle 6, and can contact effectively with the whole area of the membrane of the hollow fibers 5. Thus the dialysis apparatus having outstanding performances can be obtained. When the packing density is too high beyond the above range, the resistance for the dialysate flow becomes significantly high. This often develops channeling flow through the lower resistance portions of the hollow fiber bundle to the dialysate flow which usually occurs along the wall surface of the housing of the dialyzer. In this case, the uniform perfusion of the dialysate cannot be expected. When the packing density is too low from the range mentioned above, unevenness of the packing density in the permeable region develops because of the localization of the fibers, resulting in the dialysate channelling again. Accordingly, poor performance resulted in this case.

Next, a second embodiment of this invention will be described with reference to FIG. 9 and FIG. 10.

In the first embodiment, the inlet and outlet tubes 2 and 3 are connected to the substantially central portions of the shorter sides of the oblong cross-sections of the enlarged portions 26 and 27. However, in this embodiment, the inlet and outlet tubes 2 and 3 are connected to the substantially central portions of the longer sides of the oblong cross sections of the enlarged, portion, as shown in FIG. 9 and FIG. 10.

Figure 10:
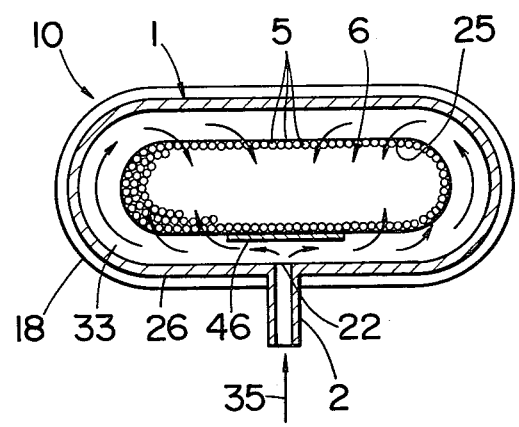
FIG. 10 is a cross-sectional view taken along the line of FIG. 9.

In the apparatus of FIG. 9 and FIG. 10, the dialysate 35 is first introduced uniformly around the hollow fiber bundle 6 from the inlet tube 2 and then flows effectively into the hollow fiber bundle 6, as shown in FIG. 10. Thus the same effects as in the first embodiment can be obtained.

Figure 11:
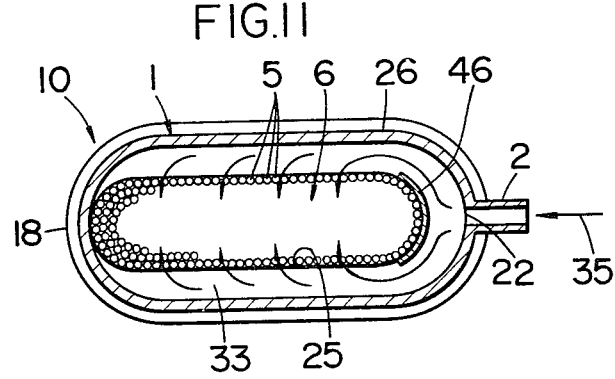
FIG. 11 is a cross-sectional view similar to FIG. 10, of a blood dialyzer according to a third embodiment of this invention.
Figure 12:
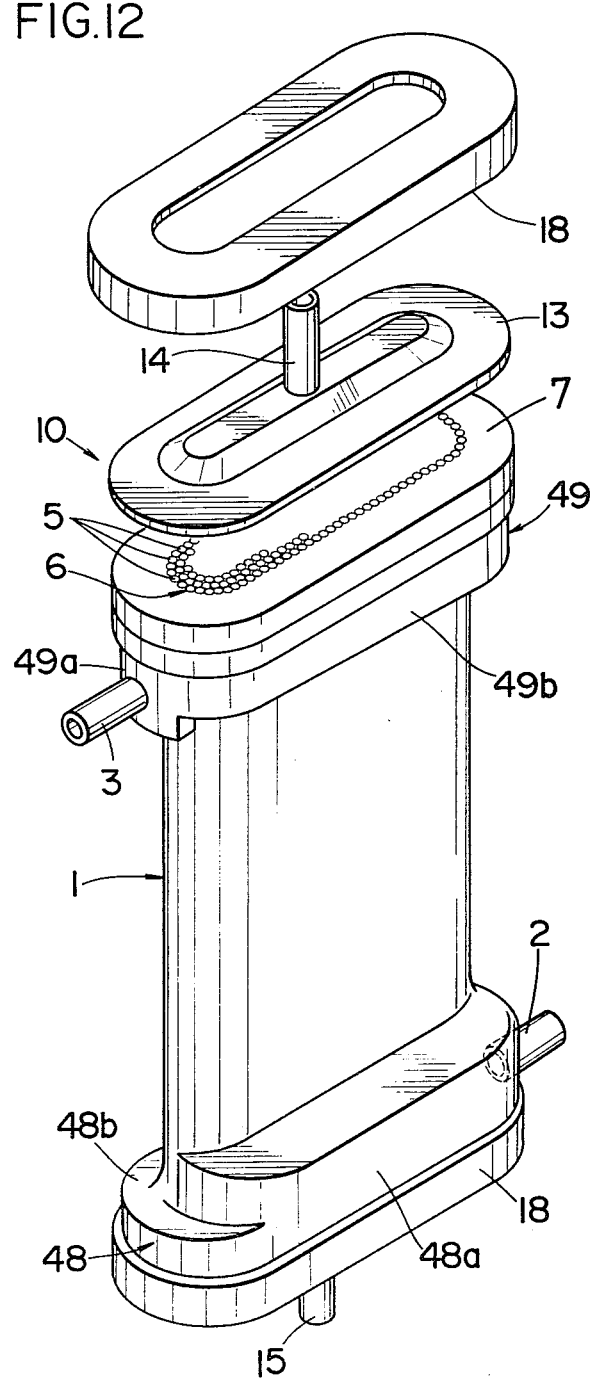
FIG. 12 is a partly exploded perspective view of a blood dialyzer according to a fourth embodiment of this invention.
Figure 13:
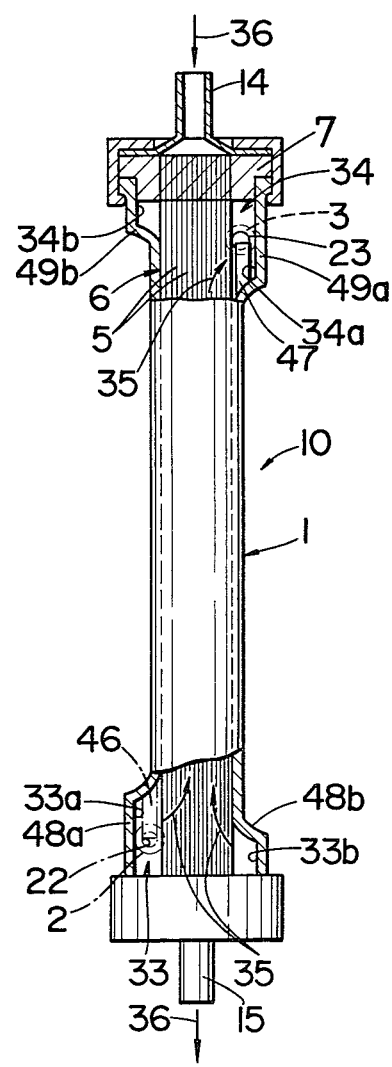
FIG. 13 is a partly broken away side view of the apparatus of FIG. 12.

Next, a third embodiment of this invention will be described with reference to FIG. 11.

In the above embodiments, the enlarged portions 26 and 27 are formed around the whole part of the hollow fiber bundle 6 at the lower and upper ends of the housing 1. However, the enlarged portions 26 and 27 are not always formed along all circumferential part of the hollow fiber bundle 6. At least at dialysate inlet side, an enlarged cross-section portion should be formed along the longer sides of the cross-section of the housing 1. For example, the enlarged cross-section portion 26 may be formed along the both longer sides and one shorter side of the cross-section of the housing 1, as shown in FIG. 11. This type of apparatus is also to enable the dialysate 35 to distribute uniformly in the hollow fiber bundle 6.

In the above embodiments, the permeating region 25 is uniformly packed with the single bundle of the hollow fibers, as shown in FIG. 6. However, the hollow fiber bundle 6 may be divided into several parts. For example, several sheet-like hollow fiber bundles may be placed in parallel with each other in the permeating region 25. Or several columnar hollow fiber bundles may be placed in a row in the permeating region 25. Or several prismatic hollow fiber bundles may be arranged in a row in the permeating region 25.

Next, a fourth embodiment of this invention will be described with reference to FIG. 12 to FIG. 15.

The cross section of the housing 1 is oblong, as in the first embodiment. Enlarged cross-section portions 48 and 49 are formed integrally with the lower and upper ends of the housing 1. The enlarged cross-section portions 48 and 49 consist of two portions 48a and 48b which are different from each other in size, and are formed on opposite sides of the hollow fiber bundle 6. Enlarged cross-section regions 33 and 34 are defined between the inner wall of the housing 1 and the circumferential surface of the hollow fiber bundle 6 by the enlarged cross-section portions 48 and 49. The enlarged cross-section regions 33 and 34 consist of two enlarged cross-section region members 33a and 33b which are different than each other in size.

The same can be said for the upper enlarged portions 34a and 34b.

The regions 33 and 34 surround the hollow fiber bundle 6 at the lower and upper ends of the housing 1. The horizontal inlet and outlet tubes 2 and 3 are connected to the opposite shorter sides of the enlarged cross-section portion members 48a and 49a. However, the inlet and outlet tubes 2 and 3 may be connected to any desired part of the enlarged cross-section portions 48 and 49, respectively. And guide plates 46 and 47 may be arranged in the enlarged cross-section regions 33.

In the same manner as in the first embodiment, the dialysate 35 is first introduced from the inlet opening 22 into the enlarged cross-section region members 33a and 33b. The latter (33b) has smaller volume than the former (33a). The dialysate 35 is effectively distributed around the hollow fiber bundle 6 in the region 33 at the lower end of the housing 1. Then the dialysate 35 flows upwardly through the hollow fibers. The dialysate is collected into the enlarged cross-section region members 34a and 34b through the whole circumference of the hollow fiber bundle 6 at the upper end of the housing 1. The dialysate 35 is thus discharged from the housing 1 through the outlet tube 3.

The experiment on the dialysis performance of the apparatus of this embodiment was made under the following housing condition, using the same hollow fibers as in the first embodiment:

Housing

Cross-wise cross section (Cross-section taken along the direction perpendicular to the length of the hollow fibers): 60 mm × 15 mm Volumes of enlarged cross-section region members 33a and 34a: 6 cm$^3$ Volumes of enlarged cross-section region members 33b and 34b: 3 cm$^3$ Volume ratios of the enlarged cross-section region members 33b and 34b to 33a and 34a: 0.5

Packing wet density of hollow fibers (volume of hollow fibers swelled with dialysate relative to volume of permeating region to be charged with hollow fibers): 41 vol%

The experimental results are shown in Table IV.

TABLE IV

| | Dialysance (ml/min) | | |
| --- | --- | --- | --- |
| | Urea | Creatinine | Vitamin B$_{12}$ |
| Apparatus of this embodiment | 162 | 140 | 34 |

Referring to the results of Table IV in comparison with the Table 1, significant increase in dialysance can be explained by the satisfactory uniform flow of the dialysate which can contact with the whole membrane area of the hollow fibers. This was effected by the fact that the hollow fiber bundle 6 is surrounded by the enlarged cross-section region members 33a and 33b, and 34a and 34b having different volume on opposite sides with the flat fibers bundle in-between, at the lower and upper ends of the housing 1. In this embodiment, the locations of larger enlarged portions (or smaller enlarged portion) on the upper and lower ends of the housing are just on reverse sides for the bundle.

It was found by the inventors that the shape of the cross-section of the housing 1 has great influence on the the dialysate flow 35 and hence the dialysis performance. The dialysis performance depends also on the thickness of the hollow fiber bundle, in other words, the ratio of the longer side to the shorter side of the cross-section of the housing 1. The experimental results on the influence of the shape of the cross section of the permeable region are shown in Table V. In these experiments, the thickness d of the permeating region 25 was varied. The thickness d means the length of the shorter side of the cross section of the intermediate portion (or permeating region) of the housing 1. The number of the hollow fibers was 7500, which had the total membrane area of 1 m². The volumes of the larger enlarged cross-section region members 33a and 34a were 8 cm³, and the volumes of the smaller enlarged cross-section region members 33b and 34b were 4 cm³ respectively. The volume ratios of the smaller region members 33b and 34b to the larger region members 33a and 34a were thus 0.5.

Other experimental conditions were the same as those given for Table I. The experimental results are shown in Table V.

TABLE V

|  | Thickness of permeating region d(mm) | Dialysance (ml/min) | | |
|---|---|---|---|---|
|  |  | Urea | Creatinine | Vitamin B$_{12}$ |
|  | 5 | 145 | 131 | 34 |
|  | 7.5 | 173 | 155 | 39 |
|  | 10 | 185 | 163 | 43 |
| Apparatus | 15 | 181 | 160 | 43 |
| of this | 20 | 180 | 158 | 42 |
| invention | 25 | 170 | 152 | 38 |
|  | 30 | 145 | 130 | 35 |

As understood from the results, good performances were obtained within the range of d of 5 mm to 30 mm. And much better results were obtained within the range of 10 mm to 20 mm.

The reason why the above described range of the thickness d is preferable, can be explained by the same way as described in the first embodiment.

In the same manner as in the first embodiment, the relationship between the packing density of the hollow fibers and the dialysance was measured. The results are shown in Table VI.

TABLE VI

|  | Packing density of hollow fibers (%) | Dialysance (ml/min) | | |
|---|---|---|---|---|
|  |  | Urea | Creatinine | Vitamin B$_{12}$ |
|  | 20 | 149 | 137 | 41 |
|  | 30 | 178 | 160 | 43 |
| Apparatus | 40 | 185 | 163 | 43 |
| of this | 50 | 178 | 160 | 42 |
| embodiment | 60 | 150 | 140 | 39 |
|  | 65 | 130 | 120 | 31 |

As understood from the Table VI, good dialysances were obtained within the range of the packing density of 20 to 60%, especially within the range of 30 to 50%.

The reason why the above range of the packing density is preferable, would be substantially the same as described in the first embodiment.

It was also found by the inventors that the volume ratios of the enlarged cross-section region members 33b and 34b to 33a and 34a affects the dialysis efficiency. The experiments on the influence of the volume ratio on the dialysis performance were carried out. The thickness d of the permeating region was fixed to 10 mm in these experiments. The number of the hollow fibers was 7500, which had 1 m² of total membrane area.

The dialyzer used in this experiment has upper and lower enlarged cross section portions which have point symmetrical configuration relative to each other. The packing density of the hollow fibers was 40%. The other conditions were the same as in the above embodiments. The results are shown in Table VII.

TABLE VII

| Volume ratio between enlarged cross-section region members | Thickness of permeating region d (mm) | Packing density of hollow fibers (%) | Dialysance (ml/min) | | |
|---|---|---|---|---|---|
|  |  |  | Urea | Creatinine | Vitamin B$_{12}$ |
| 1.0 | 10 | 40 | 170 | 151 | 42 |
| 0.8 | " | " | 183 | 163 | 43 |
| 0.6 | " | " | 186 | 163 | 43 |
| 0.4 | " | " | 184 | 164 | 44 |
| 0.2 | " | " | 183 | 163 | 43 |
| 0.1 | " | " | 180 | 160 | 43 |

It will be understood from the Table VII that good dialysances for urea and creatinine were obtained within the range of the volume ratio of 0 to 1, preferably the range of 0.2 to 0.8. The results must be due to the enlarged cross sections in this invention which consists of the different volumes of the enlarged cross-section portion members on opposite sides of the bundle, which serve to perfuse the dialysate more uniformly in the permeable region, due to the development of a cross flow component from the inlet side enlarged portion to the outlet side enlarged portion.

Next, a fifth embodiment of this invention will be described with reference to FIG. 16 and FIG. 17.

Different from the fourth embodiment, in the fifth embodiment, the inlet and outlet tubes 2 and 3 are connected to the substantially central portions of the shorter sides of the smaller enlarged cross-section portion members 48b and 49b at the lower and upper ends of the housing 1, respectively, as shown in FIG. 16 and FIG. 17. In this embodiment, the good performances can be also obtained.

Next, a sixth embodiment of this invention will be described with reference to FIG. 18.

In the fourth and fifth embodiments, the volume differences in the enlarged cross-section region members 33a and 33b, and 34a and 34b are due to the difference of the lengthwise length of the enlarged portions along the length of the hollow fibers. However, in the sixth embodiment, the volume difference of the enlarged cross-section region members 33a and 33b' and 34a and 34b' are made by the difference in cross wise width perpendicular to the length of the hollow fibers.

While there have been described preferred embodiments of the invention, obviously further modifications and variations are possible in light of the above teachings. It is therefore to be understood that within the scope of the appended claims, the invention may be practised otherwise than as specifically described.

In the above-described embodiments, the blood and the dialysate pass through the permeating region counter-currently with respect to each other. By the combination of the counter current with the uniform distribution of the dialysate obtained by the described arrangements, better performances for dialysis can be obtained. The blood and the dialysate may pass through the permeating region with the same general flow direction.

The embodiments have been described as used for dialysis between two liquids. Embodiments of the invention may be applied to the movement of material between liquid and gas, or between gas and gas through the hollow fiber membranes. Moreover, such embodiments may be used not only as a blood dialysis apparatus, but also for blood oxygen addition apparatus in an artificial lung, in which the blood flows along the inside of the hollow fibers, while the gas or the liquid containing oxygen flows along the outside of the hollow fibers. Also embodiments may be used for de-salination and purification of water by reverseosmosis, manufacturing processes for foods such as condensation of juice, removal of yeast in beer, and so on.

And in the fourth and fifth embodiments at least enlarged cross-section portion for dialysate inlet side members 48a and 48b may be formed along the longer sides of the cross-section of the housing 1. For example, the enlarged cross-section portion 48 may be formed along the both longer sides and one shorter side of the cross-section of the housing 1. Moreover, the hollow fiber bundle may consists of plural hollow fiber bundles in the housing 1.

What is claimed is:

1. In a hollow fiber permeability apparatus comprising a housing having a permeating region, a bundle of permeable-wall hollow fibers disposed in parallel in said permeating region, means for supplying a first fluid flowing between the exteriors of said fibers, and another means for passing a second fluid through the interiors of fibers such that materials selectively permeate through the walls of said fibers, said permeating region having a flattened cross-section in the direction substantially perpendicular to the lengthwise direction of said fibers, first and second enlarged cross-section portions molded integrally with said housing at the opposite ends thereof, each of said enlarged cross-section portions defining compartments between said bundle and a wall of said housing, an inlet opening defined by said first enlarged cross-section portion for introducing said first fluid into said housing, and an outlet opening defined by said second enlarged cross-section portion for removal of said first fluid from said housing, tubular elements molded integrally with said housing and communicating with said inlet opening and said outlet opening for delivering said first fluid and for removal of said first fluid, the improvement wherein each of said enlarged cross-section portions are formed along substantially the whole lengths of both longer sides of the flattened cross-section of said permeating region and along at least one shorter side of said flattened cross-section, said tubular elements being formed adjacent said shorter sides of said flattened cross-section, and said tubular elements defining passages disposed substantially in parallel with said longer sides of said flattened cross-section, at least the major portion of the bundle surfaces positioned immediately opposite the interior walls defined by said first enlarged cross-section portion being exposed to said first fluid exiting from the passage of the tubular element delivering the first fluid whereby the first fluid has unimpeded entry between the fibers from said first enlarged cross section portion, said first enlarged cross-section portion comprising separate portions including two parts formed on opposite longer sides of said hollow fiber bundle, the volume ratio of one said part to the other said part ranging from 0.2 to 0.8, said second enlarged cross-section portion comprising separate portions including two parts formed on opposite sides of said hollow fiber bundle, the volume ratio of one said part to the other said part ranging from 0.2 to 0.8, said one part of said first enlarged cross-section portion being located at the same side of the permeating region as the other part of said second enlarged cross-section portion with the other part of the first cross-section portion being located at the same side of the permeating region as the first part of said second enlarged cross-section portion, said first fluid comprising a liquid, the volume ratio of said hollow fibers swelled with said liquid relative to the volume of said permeating region to be charged with said hollow fibers being in the range of 25 to 60 percent, and wherein said means for passing said second fluid through the interiors of said fibers includes a first cap with inlet means for said second fluid, said first cap being mounted at one end of said housing, and a second cap with outlet means for said second fluid, said second cap being mounted at the other end of said housing.

2. A hollow fiber permeability apparatus according to claim 1, in which said enlarged cross-section portions are formed along the whole circumferential surface of said permeating region.

3. A hollow fiber permeability apparatus according to claim 1, in which said one part and said other part are different from each other in length along the lengthwise direction of said hollow fibers.

4. A hollow fiber permeability apparatus according to claim 1, in which said one part and said other part are equal in length along the lengthwise direction of said hollow fibers, and are different from each other in width substantially perpendicular to the lengthwise direction of said hollow fibers.

5. A hollow fiber permeability apparatus according to claim 1, in which the tubular element for delivering said first fluid is formed toward the shorter side of the cross-section of said permeating region on the one part of said first enlarged cross-section portion having larger volume, said tubular element being offset relative to the permeating region whereby it is substantially in parallel with the length of said one part of said first enlarged cross-section portion.

6. A hollow fiber permeability apparatus according to claim 1, in which said tubular element for delivering said first fluid is formed toward the shorter side of the cross-section of said permeating region on the other part of said first enlarged cross-section portion having smaller volume, said tubular element being offset relative to the permeating region whereby it is substantially in parallel with the length of said other part of said first enlarged cross-section portion.

7. A hollow fiber permeability apparatus according to claim 1, in which the two parts of said second enlarged cross-section portion are different from each other in length along the lengthwise direction of said hollow fibers.

8. A hollow fiber permeability apparatus according to claim 1, in which the two parts of said second enlarged cross-section portion are equal in length along the lengthwise direction of said hollow fibers, and are different from each other in width substantially perpendicular to the lengthwise direction of said hollow fibers.

9. A hollow fiber permeability apparatus according to claim 1, in which the tubular outlet for removal of said first fluid is formed toward the shorter side of the cross-section of said permeating region on the one part of said second enlarged cross-section portion having larger volume, said tubular outlet being offset relative to the permeating region whereby it is substantially in parallel with the length of said one part of said second enlarged cross-section portion.

10. A hollow fiber permeability apparatus according to claim 1, in which the tubular outlet for removal of said first fluid is formed toward the shorter side of the cross-section of said permeating region on the other part of said second enlarged cross-section portion having smaller volume, said tubular outlet being offset relative to the permeating region whereby it is substantially in parallel with the length of said other part of said second enlarged cross-section portion.

11. A hollow fiber permeability apparatus according to claim 1 comprising a guide plate positioned on said shorter side of said flattened cross-section opposite at least the tubular element for delivering said first fluid, said guide plate terminating short of said longer sides of said flattened cross-section, and wherein said first fluid from said tubular element is distributed by said guide plate in said first enlarged cross-section portion.

* * * * *